(12) United States Patent
Brant

(10) Patent No.: US 6,294,631 B1
(45) Date of Patent: Sep. 25, 2001

(54) HYPERBRANCHED POLYMERS BY COORDINATION POLYMERIZATION

(75) Inventor: Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/211,644

(22) Filed: Dec. 15, 1998

(51) Int. Cl.$^7$ ................ C08F 12/34; C08F 4/42
(52) U.S. Cl. ............ 526/336; 526/335; 526/348; 526/125.3; 526/160; 526/943
(58) Field of Search ................ 526/336, 160, 526/125.3, 335, 943, 348

(56) References Cited

U.S. PATENT DOCUMENTS

| | | |
|---|---|---|
| 3,351,621 | 11/1967 | Berkeley . |
| 3,658,770 | 4/1972 | Longi et al. . |
| 3,984,610 | 10/1976 | Elston . |
| 4,366,296 | 12/1982 | Kitagawa et al. . |
| 4,551,503 | 11/1985 | Lal et al. . |
| 4,931,526 | 6/1990 | Yoshitake et al. . |
| 5,444,145 | 8/1995 | Brant et al. . |
| 5,475,075 | 12/1995 | Brant et al. . |
| 5,504,171 | 4/1996 | Etherton et al. . |
| 5,530,092 | 6/1996 | Meijer et al. . |

FOREIGN PATENT DOCUMENTS

| | | |
|---|---|---|
| 0 667 359 | 8/1995 | (EP) . |
| 0 784 062 | 7/1997 | (EP) . |
| 0 885 413 | 7/1998 | (EP) . |
| 07165 814 | 6/1995 | (JP) . |
| WO 94/07930 | 4/1994 | (WO) . |
| WO 96 12744 | 5/1996 | (WO) . |
| WO 97/06201 | 2/1997 | (WO) . |
| WO 97/08216 * | 3/1997 | (WO) . |
| WO 97 38019 | 10/1997 | (WO) . |

OTHER PUBLICATIONS

Abstract for DE 196 22 272 A Dec. 4, 1997, Germany.
"The Synthesis and Properties of Hyperbranched Polyesters" Johansson, et al. Trends in Polymer Science, vol. 4 (12), Dec. 1996.
"Persistent Inventor Markets a Molecule" Naj, The Wall Street Journal Feb. 26, 1996.
"Melt Rheology of Some Model Comb Polystyrenes" Roovers, et al., Macromolecules, vol. 14, p. 766, 1981.
"New Families of Multibranched Macromolecules Synthesized" Worthy, C&EN, Feb. 22, 1988.
"Terpolymers of ethylene, propene and 1,5–hexadiene synthesized with zirconocene/methylaluminoxane" Kaminsky, et al., Makromol. Chem., Rapid Commun., vol. 11, pp. 89–94, 1990.
"Chemistry of Dendritic Molecules Holds Growing Allure for Researchers" Dagani, et al., C&EN, pp. 28–30, Feb. 1, 1993.
"Dendrimers Nearing Availability for Commercia Evaluation" O'Sullivan, C&EN, pp. 20–24, Aug. 16, 1993.
"Rational Design of the First Nonspherical Dendrimer Which Displays Calamitic Nematic and Smectic Thermotropic Liquid Crystalline Phases" Percec, et al., American Chemical Society, vol. 117, pp. 11441–11454, 1995.
"Topological Contributions to Nonlinear Elasticity in Branched Polymers" Bick, et al., The American Physical Society, vol. 76, No. 14, pp. 2587–2590, Apr. 1, 1996.
"Architecturally–Induced Tricontinuous Cubic Morphology in Compositionally Symmetric Miktoarm Starblock Copolymers" Tselikas, et al., American Chemical Society, vol. 29, pp. 3390–3396, Apr. 1,1996.
"Synthesis and Dynamic Rheological Behavior of Polybutadiene Star Polymers" Adams, et al., American Chemical Society, vol. 29, pp. 5717–5722, 1996.
"Organoplatinum Dendrimers" Achar, et al., American Chemical Society, vol. 15, pp. 43–50, 1996.

* cited by examiner

Primary Examiner—David W. Wu
Assistant Examiner—Ling-Siu Choi
(74) Attorney, Agent, or Firm—Charles E. Runyan

(57) ABSTRACT

Hyperbranched copolymers comprising at least one $C_2$–$C_{20}$ α-monoolefin monomers and 0.2 to 20 mole % of at least one α,ω-non-conjugated diene monomers having 5 to 18 carbon atoms are prepared by coordination (metallocene) copolymerization of the monomers and quenching the reaction prior to the formation of a gelled product. The building blocks of the products are characterized by a number average molecular weight less than 5 times the entanglement molecular weight of a homopolymer prepared using the same catalyst but in the absence of the diene component.

25 Claims, 5 Drawing Sheets

Fig. 1

Molecular Weight Distribution and Branching Index g' for a Representative Sample

Fig. 8

US 6,294,631 B1

HYPERBRANCHED POLYMERS BY COORDINATION POLYMERIZATION

BACKGROUND OF THE INVENTION

1. Field of the Invention

This invention relates to the production of hyperbranched α-olefin polymers.

2. Description of the Related Art

It is known in the art to prepare copolymers of at least one α-olefin and an α,ω-diene. For example, selected dienes have been copolymerized with α-olefins in order to introduce unsaturation into the polymer as a site for chemical reactions such as crosslinking. In U.S. Pat. No. 3,658,770 to Longi et al., it is taught that these dienes should be non-conjugated and should have two different kinds of double bonds, the first double bond being copolymerizable with the α-olefin and the second double bond being non-copolymerizable by Ziegler-type catalysts. Thus, useful classes of dienes for introduction of unsaturation into ethylene-propylene terpolymers are straight-chain and branched-chain acyclic dienes, single ring alicyclic dienes, and multi-ring alicyclic and bridged ring dienes, wherein one of the double bonds will copolymerize while the second is inert to the catalyst. Such useful dienes are 1,4-hexadiene, dicyclopentadiene and 5-ethylidene-2-norbornene.

The copolymerization of branched 1,4-dienes with ethylene, propylene or 4-methyl-1-pentene is similarly described in U.S. Pat. No. 4,366,296 to Kitigawa et al. While the copolymerization of propylene with α,ω-dienes of at least 6 carbon atoms using a Ziegler type catalyst in a hydrocarbon diluent is taught in U.S. Pat. No. 3,351,621 to Bacskai, the copolymerization has invariably led to a copolymer insoluble in hot decahydronaphthalene, indicative of the presence of cross-links and gel.

U.S. Pat. 4,931,526 discloses the preparation of relatively linear copolymers by copolymerizing a branched α-olefin having 5 to 10 carbon atoms and α,ω-non-conjugated diene having 6 to 20 carbon atoms using a solid inhomogeneous or heterogeneous catalyst containing a titanium, magnesium, halogen and electron donor component, an organo aluminum component and an electron donor. The copolymer is characterized as being partially crystalline and contains recurring units of the copolymerized diene component at least partially in cyclized form.

U.S. Pat. No. 3,984,610 discloses branched copolymers of ethylene and an α,ω-diene having at least 8 carbon atoms, wherein each double bond is readily polymerizable. The copolymers are partially crystalline and are prepared using a coordination catalyst comprising an alkyl aluminum chloride/vanadium oxychloride complex.

In addition, U.S. Pat. 5,504,171 discloses the preparation of crystalline, gel-free copolymers of an α olefin, e.g. propylene, and up to 5 mole % of an α,ω-diene. The copolymer is prepared using a solid-phase, insoluble, heterogeneous coordination catalyst, e.g., a Ziegler catalyst, in a solvent free medium. The product is characterized as containing unsaturated side chains and branched chains, and has a branching index (g') stated as ranging from 0.2 to 0.9. The patent discloses that soluble catalysts such as biscyclopentadienyl titanium (IV) dichloride-aluminum alkyl systems are unsuitable because gelled polymer products are obtained.

Hyperbranched polymers and dendrimers are a relatively new class of polymers which have a highly branched backbone structure. Dendrimers are exact, monodisperse structures built layerwise (in generations) around a core moiety, with a polymer branching point in every repeating unit. Typical dendritic macromolecules based on vinyl-cyanide and fumaryl dinitrile units are disclosed in U.S. Pat. 5,530,092. Hyperbranched polymers possess a number of characteristics which are similar to dendrimers but they are polydisperse and contain relatively linear segments off of which a plurality of highly branched segments are grown or attached. WO 97/06201 discloses the preparation of hyperbranched polymers containing a plurality of polyolefin arms linked to a polymer backbone by coupling a polyolefin pre-arm with a polymeric backbone or difunctional monomer containing functional groups reactive with the polymer pre-arm.

Hyperbranched polymers are characterized by the fact that once a backbone polymer segment is defined or chosen, the vast bulk of the molecular weight of the polymer is accounted for by the branched polymer segments and a smaller amount of the molecular weight is accounted for by the relatively linear segments to which the branched segments are attached. This means that even relatively high molecular weight hyperbranched polymers will exhibit a relatively low viscosity making them ideal candidates as rheology modifiers, oil additives, polymer plasticizers, low volatile organic content additives for theremosettable coatings and paints and similar applications. Unfortunately, however, hyperbranched polymers and dendrimers have been made by relatively expensive and laborious pathways which adds considerably to the cost.

SUMMARY OF THE INVENTION

The present invention provides a method for preparing hyperbranched polymers by coordination polymerization of one or a mixture of α-olefin monomers and up to about 20 mole % of an α,ω-non-conjugated diene. The invention also provides hyperbranched copolymers containing relatively linear, low molecular weight α-olefin polymer segments randomly copolymerized at one olefinic end of an α,ω-non-conjugated diene which in turn is copolymerized at the other olefinic end with a highly branched olefin copolymer segment.

The invention also provides a hyperbranched olefin copolymer made by coordination polymerization comprising one or more linear or branched α-monoolefin monomers having from 2 to 20 carbon atoms randomly copolymerized with from at least 0.2 to 20 mole % of at least one α,ω-non-conjugated diene having from 5 to 18 carbon atoms, said copolymer characterized by highly branched polymer segments comprising said copolymerized α-monoolefin and diene copolymerized at one olefinic end group of said diene, said copolymer having a number average molecular weight as measured by GPC-Viscosity of less than about 5 times the entanglement molecular weight of said polymer if made using the same catalyst system under the same conditions but without the presence of the α,ω-diene component and having a gel content of less than about 1.5 wt %.

The invention further provides a process for preparing a hyperbranched olefin copolymer comprising copolymerizing one or more linear or branched α-mono-olefin monomers having from 2 to 20 carbon atoms and at least 0.2 to 20 mole % of one α,ω-diene monomers having from 5 to 18 carbon atoms in the presence of a coordination catalyst until a polymer having a weight average molecular weight as measured by GPC-Viscometry of less than about 5 times the entanglement molecular weight of said polymer if made using the same catalyst system but without the presence of the α,ω-diene component is achieved, and quenching said copolymerization reaction prior to the formation of a gelled copolymer product.

DETAILED DESCRIPTION OF THE INVENTION

The invention involves the polymerization of one or a mixture of linear or branched α-olefin monomers having from 2 to 20 carbon atoms, more preferably from 4 to 12 carbon atoms, and one or a mixture of α,ω-non-conjugated dienes having from 5 to 18 carbon atoms, more preferably 5 to 12 carbon atoms.

Suitable α-olefins include, for example, ethylene, propylene, butene-1, pentene-1, hexene-1, heptene-1, 4-methyl-1-pentene, 4-methyl-1-hexene, 5-methyl-1-hexene, 1-octene, 1-decene, 1-undecene, 1-dodecene and the like. Of these, olefins with 4–12 carbon atoms are preferred.

Suitable α,ω-dienes include 1,5-hexadiene, 1,6-heptadiene, 1,7-octadiene, 1,8-nonadiene, 1,9-decadiene, 1,10-undecadiene, 1,11-dodecadiene and so forth. Additionally included as effective dienes are both vinyl norbornene and norbornadiene, each of which reacts equivalently to the α,ω-dienes in accordance with the invention.

The α,ω-diene typically will comprise from about 0.2 to about 20–25 mole % of the copolymer as understood from mass balances derived from the examples. More typically, the diene comprises greater than 2 up to about 10 mole % of the copolymer, most typically from about 3.0–8.5 mole % of the copolymer. Even at relatively high diene content of 2 mole % and above, copolymers are produced which contain less than 1 wt % gel, or preferably no detectable gel based on GPC mass balance.

Coordination catalysts which may be used to prepare the hyperbranched copolymers of this invention may be described as those catalysts for olefin polymerization which are capable of randomly incorporating both the α-olefin monomer(s) and the bulky α,ω-non-conjugated diene monomer(s) into the copolymer structure. These coordination catalysts are also typically reactive with both double bond ends of the diene monomer such that polymer chains will propagate off the relatively linear mono-olefin backbone segments to form highly branched or dendrimer-like polymer branches randomly containing both polymerized α-olefin and α,ω-diene segments.

The preferred coordination catalyst comprises a metallocene catalyst with cocatalyst activators of an alumoxane, a "non-coordinating" anion containing precursor salt compound or other neutral reagent, such as the Lewis acids of halogenated aryl boron or aryl aluminum compounds. Preferred catalysts which may be used are one or more metallocene compounds represented by the formula $Cp_m MR_n X_q$ wherein Cp is a cyclopentadienyl or hetero-atom containing cyclopentadienyl ring which may be substituted, or derivative thereof which may be further substituted, M is a Group 3, 4, 5, or 6 transition metal, for example scandium, titanium, zirconium, hafnium, vanadium, niobium, tantalum, chromium, molybdenum and tungsten, R is a hydrocarbyl group or hydrocarbyloxy group having from one to 20 carbon atoms, X is a halogen, and m=1–3, n=0–3, and q=0–3. The preferred metallocene catalysts are activated cyclopentadienyl group-3–6 transition metal compounds. For example, metallocene catalysts which may be employed in this invention are organometallic coordination compounds which are cyclopentadienyl derivatives of groups 3–6 metals of the periodic table of the elements and include mono- and biscyclopentadienyls and their derivatives. These preferably comprise titanocenes, zirconocenes, or hafnocenes, most preferably hafnocenes and zirconocenes for biscyclopentadienyl compounds and titanium, vanadium or scandium for mono-cyclopentadienyl compounds. Substituents present on the cyclopentadienyl rings, such inclusive of indenyl, fluorenyl and azulenyl derivatives of cyclopentadienyl groups, typically include one or more $C_1$ to $C_{30}$ hydrocarbon or hydrocarbylsilyl groups selected from linear, branched, cyclic, aliphatic, aromatic or combined structure groups, including fused-ring or pendant configurations. Examples include methyl, isopropyl, n-propyl, n-butyl, isobutyl, tertiary butyl, neopentyl, phenyl, n-hexyl, cyclohexyl, and benzyl. For the purposes of this application the term "hydrocarbon" or "hydrocarbyl" is meant to include those compounds or groups that have essentially hydrocarbon characteristics but optionally contain not more than about 10 mol. % non-carbon atoms, such as boron, silicon, oxygen, nitrogen, sulfur and phosphorous. Similarly the use of hetero-atom containing cyclopentadienyl rings or fused rings, where a non-carbon Group 14, 15 or 16 atom replaces one of the ring carbons in the Cp ring or in a ring fused thereto, is considered for this specification to be within the terms "cyclopentadienyl", "indenyl", and "fluorenyl". See, for example, the teachings of WO 98/37106, having common priority with U.S. Ser. No. 08/999,214, filed Dec. 29, 1997, and WO 98/41530, having common priority with U.S. Ser. No. 09/042,378, filed Mar. 13, 1998, incorporated by reference for purposes of U.S. patent practice.

Additional description of suitable metallocene compounds appears in the patent literature, for example EP-A-0 129 368, U.S. Pat. Nos. 4,871,705, 4,937,299, 5,324,800 EP-A-0 418 044, EP-A-0 591 756, WO-A-92/00333 and WO-A-94/01471. Such mono- or biscyclopentadienyl metallocene compounds are typically transition metal compounds wherein the ancillary ligands may be themselves substituted with one or more groups and may be bridged to each other, or may be bridged through a heteroatom to the transition metal. The size and constituency of the ancillary ligands and bridging elements are generally not critical in the preparation of the polymers of the invention but should be selected in the literature described manner to enhance the polymerization activity and polymer characteristics being sought so long as the active polymerization site is fairly open, that is capable of incorporating olefins higher in molecular weight than ethylene. Preferably the cyclopentadienyl rings (including substituted cyclopentadienyl-based fused ring systems, such as indenyl, fluorenyl, azulenyl, or substituted analogs of them), will be bridged to each other, and can be lower alkyl-substituted ($C_1$–$C_6$) in the 2 position (without or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. For bulky ancillary ligands as large as fluorenyl groups, bridged unbalanced catalysts are preferred, for example, those additionally comprising an unsubstituted cyclopentadienyl or hetroatom ancillary ligand bonded to the bulky ligand through a covalent bridging group and independently bonded to the metal center. Substituents on the ancillary ligands or bridging groups should each have essentially hydrocarbyl characteristics and will typically contain up to 30 carbon atoms but may be hetero-atom containing with 1–5 non-hydrogen/carbon atoms, e.g., N, S, O, P, Ge, B and Si. All documents are incorporated by reference for purposes of U.S. patent practice.

Additional organometallic transition metal compounds suitable as coordination polymerization catalysts in accordance with the invention will be any of those Group 3–10 that can be activated for olefin polymerization and are capable of producing narrow molecular weight distribution polymers, incorporating larger monomers, e.g., such as $C_6$ and higher cyclic olefins, $C_4$ and higher geminally disubstituted olefins, and $C_8$ and higher vinyl aromatic monomers. Exemplary compounds include those described in the patent literature. U.S. Pat. No. 5,763,556 describes the use of monocyclopentadienyl catalysts capable of preparing copolymers of ethylene and geminally disubstituted olefins, such as isobutylene. U.S. Pat. No. 5,324,801 and U.S. Pat. No. 5,635,573 describe the use of mono- and biscyclopentadienyl catalyst systems capable of preparing copolymers of ethylene and cyclic olefins, such as norbornene and tetracyclododecene. U.S. Pat. No. 5,318,935 describes bridged and unbridged bisamido transition metal catalyst compounds of Group 4 metals capable of insertion polymerization of ethylene and higher carbon number α-olefins. International patent publications WO 96/23010 and WO 97/48735 describe diimine nickel and palladium compounds suitable for ionic activation and olefin polymerization. Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Bridged bis(arylamido) Group 4 compounds for olefin polymerization are described by D. H. McConville, et al, in *Organometallics* 1995, 14, 5478–5480. Synthesis methods and compound characterization are presented. Further work appearing in D. H. McConville, et al, *Macromolecules* 1996, 29, 5241–5243, described the bridged bis (arylamido) Group 4 compounds are active catalysts for polymerization of 1-hexene. See also, WO 98/37109. Both of WO 96/23010 and Gibson, et al, *Chem. Comm.*, pp. 849–850 (1998) describe diimine-based ligands for metals in Groups 8–10. Additional transition metal compounds suitable in accordance with the invention include those described in co-pending U.S. patent applications Ser. No. 08/798,401, filed Feb. 7, 1997, published as WO 98/34964, Ser. No. 08/803,687 filed Feb. 14, 1997, Ser. No. 08/999,214 filed Dec. 19, 1997, Ser. No. 09/042378, filed Mar. 13, 1998 and based on provisional application 60/041258 filed Mar. 17, 1997, and Ser. No. 08/473,693 filed Jun. 7, 1995 and published as WO 96140805. Each of these documents is incorporated by reference for the purposes of U.S. patent practice.

The catalysts are typically prepared by combining at least two components, the organometallic catalyst component and an activating cocatalyst component, that is a cocatalyst component that when reacted with the organometallic catalyst component renders it capable of olefin polymerization. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

In general, suitable anions for the second component may be any stable and bulky anionic complex having the following molecular attributes: 1) the anion should have a molecular diameter greater than 4 Å; 2) the negative charge on the anion should be delocalized over the framework of the anion or be localized within the core of the anion; 3) the anion should be a relatively poor nucleophile; and 4) the anion should not be a powerful reducing or oxidizing agent. Anions meeting these criteria such as aryl-substituted aluminate or borate anions, boranes, carboranes, metallacarboranes, polyoxoanions and anionic coordination complexes are well described in the chemical literature.

The cation portion of the second component may comprise Bronsted acids such as protons or protonated Lewis bases or may comprise reducible Lewis acids such as ferricinum, tropylium, triphenylcarbenium or silver cations.

In another preferred embodiment, the second component is a Lewis-acid complex which will react with at least one ligand of the first component, thereby forming an ionic species with the ligand abstracted from the first component now bound to the second component. Alumoxanes and especially methylalumoxane, the product formed from the reaction of trimethylaluminum in an aliphatic or aromatic hydrocarbon solvent with stoichiometric quantities of water, are particularly preferred Lewis-acid second components; as are the halogenated bis-and trisaryl Lewis acids of aluminum and boron.

In another preferred embodiment, the second component comprises compounds containing a tetrakispentafluoroaryl boron anion; two or more bis- or trisperfluoroaryl boron anion groups covalently bonded to a central atomic molecular or polymer complex, examples include trispentafluorophenyl borane, tris(perfluorobiphenyl) borane; and tetrakis perfluorophenyl boron.

Particularly preferred first components for the metallocene catalysts used in the invention include:
dimethylsilyl bis(cyclopentadienyl) hafnium dimethyl;
dimethylsilyl bis(tetrahydroindenyl) hafnium dimethyl;
dimethylsilyl bis(indenyl) hafnium dimethyl;
bis(cyclopentadienyl) hafnium dimethyl;
dimethylsilyl bis(cyclopentadienyl) hafnium dichloride;
dimethylsilyl bis(tetrahydroindenyl) hafnium dichloride;
dimethylsilyl bis(indenyl) hafnium dichloride;
bis(cyclopentadienyl) hafnium dichloride;
dimethylsilyl bis(cyclopentadienyl) zirconium dimethyl;
dimethylsilyl bis(tetrahydroindenyl) zirconium dimethyl;
dimethylsilyl bis(indenyl) zirconium dimethyl;

bis(cyclopentadienyl) zirconium dimethyl;
dimethylsilyl bis(cyclopentadienyl) zirconium dichloride;
dimethylsilyl bis(tetrahydroindenyl) zirconium dichloride;
dimethylsilyl bis(indenyl) zirconium dichloride; and
bis(cyclopendtadienyl) zirconium dichloride.

Metallocene catalysts of the type described herein are more specifically disclosed in U.S. Pat. Nos. 5,198,401, 5,444,145, 5,475,075, 5,635,573, 5,767,208 and International Publication nos. WO 96133227 and WO98/37109, the complete disclosures of which are incorporated herein by reference.

Suitable alumoxanes which may be utilized as the cocatalyst, or second, component in the catalyst systems of this invention are those prepared by the hydrolysis of a trialkylaluminum, such as trimethylaluminum, triethylaluminum, tripropylaluminum, triisobutylaluminum, dimethylaluminum chloride, diisobutylaluminum chloride, diethylaluminum chloride and the like. The most preferred alumoxane for use is methylalumoxane (MAO) or modified alkyalumoxy compound. Methylalumoxanes having an average degree of oligomerization of from about 4 to about 25, with a preferred range of 13 to 25, are the most preferred due to availability.

The catalyst system may be conveniently prepared by placing the selected transition metal component and the selected alumoxane or ionizing activating component(s), in any order of addition, in an alkane or aromatic hydrocarbon solvent, preferably one which is also suitable for service as polymerization diluent. Where the hydrocarbon solvent utilized is also suitable for use as a polymerization diluent, the catalyst system may be prepared in situ in the polymerization reactor. Alternatively, the catalyst system may be separately prepared, in concentrated form, and added to the polymerization diluent in a reactor. Or, if desired, the components of the catalyst system may be prepared as separate solutions and added to the polymerization diluent in a reactor, in appropriate ratios, as is suitable for a continuous liquid polymerization reaction procedure. Alkane and aromatic hydrocarbons suitable as solvents for formation of the catalyst system and also as a polymerization diluent include straight and branched chain hydrocarbons such as isobutane, butane, pentane, hexane, heptane, octane, and the like; cyclic and alicyclic hydrocarbons such as cyclohexane, cycloheptane, methylcyclohexane, methylcycloheptane and the like; and aromatic and alkyl-substituted aromatic compounds such as benzene, toluene, xylene and the like. Suitable solvents also include liquid olefins which may act as monomers or comonomers, including ethylene, propylene, 1-butene, 1-hexene and the like, particularly when the catalyst components are prepared as separate solutions.

The catalysts of this invention may be supported by physically combining them, or chemically reacting them, with polymeric or metal/metalloid based supports, and such that are chemically modified so as to be either unreactive or reactive with either catalyst or cocatalyst components. Suitable supports include silica, silica-alumina, magnesium chloride, polyolefins, polystyrene, and cross-linked polystyrene. Thus any of the art known means of supporting metallocene catalysts can be suitably used in accordance with the invention. U.S. Pat. Nos. 4,808,561, 5,057,475, 5,427,991, 5,643,847 and PCT International publication WO 91/09882, disclose examples of supported catalysts and the methods to produce such and are herein incorporated by reference for purposes of U.S. patent purposes. Additionally, scavengers may be used in the polymerization process according to the invention. Such serve to reduce or eliminate polar impurities that may be inadvertently introduced into the polymerization medium. Suitable compounds and means of their use are well-known inte art. See, for example U.S. Pat. Nos. 5,153,157 and 5,767,208, incorporated by reference for purposes of U. S. patent purposes. Suitable "scavenging" compounds include alkyl aluminums, alkyl boranes, and alkylalumoxanes, particularly when using the boron-based cocatalysts or supported catalysts since the aluminoxy compounds can serve both to activate the catalyst component and scavenge impurities if present in sufficient amounts.

In accordance with the invention, effective results are generally obtained wherein the transition metal compound is present in the polymerization diluent in a concentration of preferably from about 0.00001 to about 10.0 millimoles/liter of diluent and a stoichiometric excess of the transition metal (metallocene) compound. An alumoxane component, when used, is present in an amount to provide a molar aluminum to transition metal ratio of from about 0.5:1 to about 20,000:1, whereas there is not generally such a large excess when the activator compound is a bulky non-coordinating anion such as a boron-containing compound. Sufficient solvent is normally used so as to provide adequate dilution heat transfer away from the catalyst components during reaction and to permit good mixing.

The reactor charge may also include diethyl zinc, hydrogen or other suitable chain transfer agent to further control molecular weight and chain end functionality, but the use of such agents is not necessary to produce the hyperbranched polymers of the invention.

The catalyst system ingredients, that is, the transition metal catalyst component, the cococatalyst activators, and polymerization diluent can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 20° C. to 1 00° C., most preferably from about 20° C. to about 60° C.

At all times, the individual catalyst system components, as well as the catalyst system once formed, are protected from oxygen and moisture. Therefore, the reactions are performed in an oxygen and moisture free atmosphere and, where the catalyst system is recovered separately, it is recovered in an oxygen and moisture free atmosphere. Preferably, therefore, the reactions are performed in the presence of an inert dry gas such as, for example, helium, argon, or nitrogen. The reaction is quenched prior to the development of a cross-linked or gelled polymer product by exposure of the reaction medium to air carbon dioxide and/or water and/or a lower alcohol. Other Lewis or Bronsted bases can also be used.

In a preferred embodiment of the process of this invention the catalyst system is utilized in the liquid phase (slurry, solution, suspension or bulk phase or combination thereof), high pressure fluid phase or gas phase (where the α-olefin and diolefin are sufficiently volatile), or other process suitable for the copolymerization of ethylene, α-olefin and diolefin. These processes may be employed singularly or in a series. The liquid phase process comprises the steps of contacting α-olefin and diene monomers with the catalyst system in a suitable polymerization diluent and reacting said monomers in the presence of said catalyst system for a time and a temperature sufficient to produce a copolymer of high molecular weight. Conditions most preferred for the copolymerization of α-olefin are those wherein α-olefin is submitted to the reaction zone at pressures of from about 0.019 psia to about 50,000 psia and the reaction temperature is maintained at from about −100° C. to about 300° C. In the case of MAO activation, or other aluminum containing activator, an aluminum to transition metal molar ratio is preferably from about 1 :1 to 20,000:1. A more preferable range would be 1:1 to 2000:1. A boron-containing or other non-coordinating anion can be used at a molar ratio to the transition metal from 1:2 to 2:1, but a molar excess of the anion is preferably used. The reaction time is preferably from about 10 seconds to about 4 hours.

Preferably, the reactor charge comprises from about 0.1 to 20 wt % of the diene component based on the total weight of polymerizable monomers. Typical feed ratio of diene/olefin is generally ≧2%.

In general, polymerization conditions are selected such that the degree of polymerization (DP) of the polymer in the absence of the α,ω-diene, would be less than 400, preferably less than 200 and more preferably less than 100 repeating monomer units. As indicated by the examples; where $r_1r_2 \sim 1$ then DP is less than 40 repeating monomer units. In other words, the number average molecular weight of the polymer, if diene-free, should be not more than about 5 times, preferably not more than 3 times, the molecular weight at which the polymer chains would become entangled, the entanglement molecular weight (Me). This means that in the absence of α,ω-diene, the polymer would not have a significant amount of cohesive strength, and is itself just an oligomer.

A key feature of the present invention is that the polymerization reaction must be quenched prior to the development of a highly crosslinked polymer structure which leads to a gelled, intractable polymer product. The determination of such quench time will vary as a function of the particular monomers used and their relative ratios, the temperature of the reaction and the identity of the particular catalyst employed in the reaction. If $(k_p/k_t)$ ($k_p$=the rate at which the catalyst causes monomer propagation; $k_t$=the rate at which the polymer chains stop growing) of the catalyst is low, e.g., below about 100, and the ratio of diene and α-olefin is chosen appropriately within the above described parameters, conditions will be generated that will lead largely to the development of a gel free hyperbranched polymer. Suitable quenching agents include air, alcohols, water and the like.

Copolymers prepared in accordance with this invention may be characterized as materials having a degree of crystallinity of less than 40%, preferably less than 30%, a number average molecular weight (measured by GPC-Lalls) of less than about 5 times, preferably less than about 3 times, the entanglement molecular weight ($M_e$) of a polymer which would be made using the same catalyst system but without the presence of the α,ω diene component, a molecular weight distribution ($M_w/M_n$) of greater than 5, preferably greater than 8, an $M_z/M_w$ molecular weight ratio of greater than 3, preferably greater than 5 and a slope of a plot of log (intrinsic viscosity) vs log ($M_w$) of less than 0.6, preferably less than or equal to 0.5. The copolymers of this invention may also be characterized as containing less than about 1.5 wt % gel, preferably less than 1 wt % gel.

Entanglement molecular weight ($M_e$) is a well known quantity which governs the viscosity of polymer melts. As monomers propagate during polymerization, there is a generally linear relationship between log (molecular weight) increase and log (viscosity) increase. When ($M_e$) is achieved, the polymer molecules begin to entangle, and this point is reflected by a marked shift upward of viscosity vs. molecular weight.

Typical $M_e$ values for known polymers as well as the degree of polymerization (DP), which is the number of monomer units strung together for an entanglement, are as follows:

|  | (Me) | (DP) |
|---|---|---|
| Polyethylene | 1250 | 44 |
| Polypropylene | 4500–5,000 | 113 |
| Polybutene-1 | 13,900 | 248 |
| Polyhexene-1 | 8800 | 105 |
| Polyoctene-1 | 18,000 | 161 |
| Polydecene-1 | 23,300 | 166 |

The copolymers of this invention may also be characterized as having a broad value of g' and low average branching index ($g'_{avg}$) which is indicative of the presence of highly branched, extremely compact molecular structures. The term g' refers to branching index and is defined by the formula:

$$g' \equiv \frac{[\eta]_{br}}{[\eta]_{lin}}$$

where $[\eta]_{br}$ is the experimentally measured viscosity of the branched copolymer of the invention and $[\eta]_{lin}$ is the viscosity expected for the mass of polymer measured assuming a linear polymer chain topology.

Values for $g'_{avg}$ of polymers prepared in accordance with this invention may generally range from about 0.05 up to less than 0.5, preferably less than 0.35.

The molecular weight moments of polymers are defined by equations:

$$M_n = \Sigma n_i M_i / \Sigma n_i$$

$$M_w = \Sigma n_i M_i^2 / \Sigma n_i M_i$$

$$M_z = \Sigma n_i M_i^3 / \Sigma n_i M_i^2$$

where $n_i$ is the number of chains and $M_i$ is the mass of the ith chain. $M_w$ and, even more so, $M_z$ mathematically emphasize the presence of high molecular weight polymer. Also note that in the early stage of polymerization, chains can be created containing dangling vinyl groups, and little interlinking takes place. Over time, interlinking is more prevalent and eventually results in formation of gel. Due to the different time scales for initiation, growth, and termination of a linear chain versus the interlinking of chains the number of chains grows to a maximum early on and then, with depletion of monomer, drops markedly due to interlinking. For chains with Mn of just 1,500 in the absence of interlinking, propagation through 20 or more interlinks is not unreasonable. For chains with low molecular weight, degree of polymerization is just 20 or so. Assuming random copolymerization and molar ratio of diene/olefin of <0.12, a significant number of chains will not contain diene and so cannot participate in interlinking. Their count stays constant throughout the subsequent interlinking process, whereas the number of chains containing dienes can plummet and approach 1 at gel. Thus, to first approximation, it would be normal to find that Mn is only marginally affected by the interlinking process.

The copolymers of the invention are also characterized by a relatively high degree of residual unsaturation accounted for by unreacted vinylidene, vinyl and vinylene moieties present in the hyperbranched polymer structure. This is accounted for by the fact that even though the coordination catalyst used to prepare the copolymers is reactive with both double bond ends of the α,ω(o-diene monomer, interlinking kinetics can be suppressed or slowed when the chain length of the α,ω-diene is equal to or shorter than the chain length of the α-olefin comonomer. In general, hyperbranched copolymers polymerized in the absence of molecular weight control agents such as hydrogen will typically contain a total from about 0.1 to about 5 mole % of combined vinylidene, vinyl and vinylene residual unsaturation.

The presence of this residual unsaturation makes these copolymers ideal substrates for further reactions. For example, functional groups containing epoxy, aldehyde, halogen, amino, amido, nitro or hydroxy functionality may be incorporated into the polymer by catalytic or stoichiometric reactions across the double bonds. Additionally, traditional Diels-Alder syntheses may be used to attach other groups to the polymers. These polymers may also be further modified by free-radical graft polymerization of monomers in the presence of the substrate copolymer, such monomers including acrylates and methacrylates, acrylonitrile, unsaturated carboxylic acids, their esters and the like, for example, maleic acid or maleic anhydride.

The hyperbranched polymers of this invention have a number of applications. Because of their very low melt viscosity, they are particularly useful as processing aids when blended with other polymers, as components in melt sprayable adhesive compositions, viscosity modifiers for oils or as surfactant components with appropriate chemical modification.

The GPC analyses relevant to the Examples which follow were performed using a Waters 150C instrument equipped with a differential refractive index detector (DRI) and an on-line viscosity detector (Viscotek 150R). The following experimental protocol was adopted. All samples were dissolved in 1,2,4-trichlorobenzene (TCB) at 120–140° C. for a period of 24 hours. Typical sample concentrations ranged between 2 and 4 mg/mL and the injected volume was fixed at 319 μL (300 μL nominal setting). The size separation was carried out using three Polymer Laboratories columns (PLgel, Mixed-B) and a flow rate of 0.5 mL/min. The injector and column compartment were maintained at 135° C. The GPC instrument was calibrated using fifteen Polymer Laboratories narrow polystyrene (PS) standards with molecular weights between 980 and $9.8 \times 10^5$. The retention volume offset of the viscosity detector with respect to the DRI was calculated by injecting pentacontane ($C_{50}H_{102}$. The calibration and data analyses were performed using TriSEC software, version 2.7 from Viscotek Co. The amount of polymer flowing through the DRI detector was calculated from the signal area and compared with the injected amount to verify mass recovery. The refractive index increment, dn/dc, was −0.104 mL/g and no attempt was made to correct for differences due to low-molecular weight species. The mass recovery was generally close to 100% with a few cases that displayed 10–13% mass loss.

The molecular weight distribution (MWD or $M_w/M_n$) was calculated from the raw chromatograms in two ways. The polypropylene-equivalent molecular weights were calculated from the DRI signal using the values for the Mark-Houwink coefficients of polystyrene (PS) and polypropylene (PP) in TCB at 135° C. reported below.

TABLE 1

|    | K × $10^4$ (dL/g) | a     |
|----|-------------------|-------|
| PS | 1.26              | 0.7   |
| PP | 2.10              | 0.725 |

The absolute molecular weight was determined at each retention volume using the measured slice intrinsic viscosity in conjunction with the concept of universal calibration. The branching index, g', defined above, was calculated across the MWD from the measured slice intrinsic viscosity of the sample and the intrinsic viscosity of linear PP of the same molecular weight. The latter was calculated using the Mark-Houwink coefficients of PP reported in Table 1.

Figure 1:
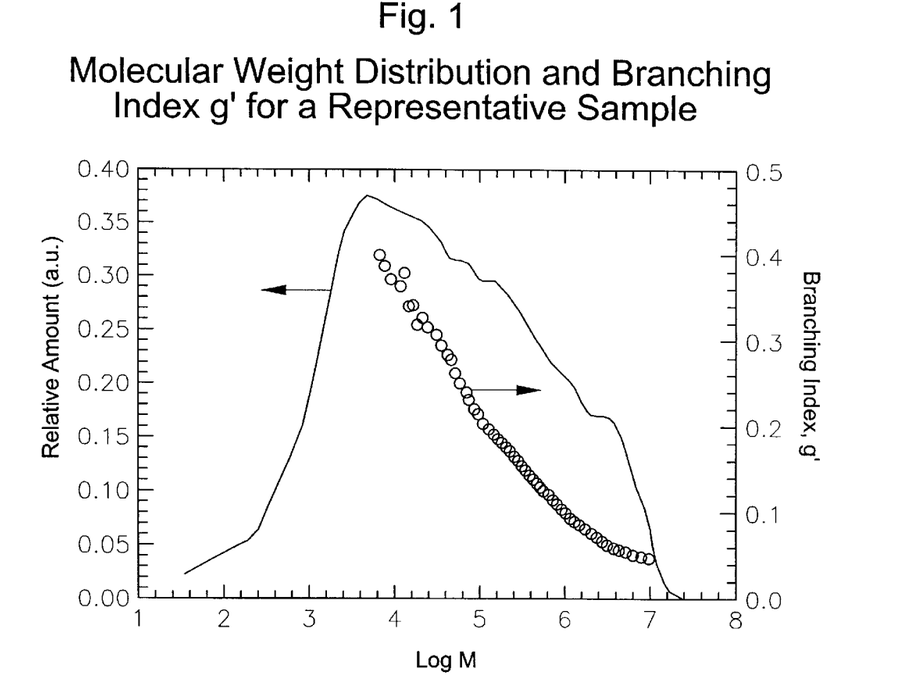
FIG. 1 is a graphic depiction of a gel permeation chromatogram showing the weight-average molecular weight distribution (log M) and branching index distribution (g') of a copolymer of this invention.

FIG. 1 shows the MWD and the distribution of g' with molecular weight for a representative sample. In this case, rather high molecular weights are achieved, up to $10^7$, with a rather high polydispersity, $M_w/M_n=120$.

The remarkable feature of the data shown in FIG. 1 is the extremely low values of g'. The index reaches values as low as 0.05, lower than many HP-LDPE (high pressure, low density polyethylene) polymers. The low g' values indicate the presence of highly branched, extremely compact molecular structures, which exhibit very interesting flow properties. The following examples are illustrative of the invention.

EXAMPLE #1

In this polymerization, 10 mg of dimethylsilyl bis (tetrahydroindenyl) zirconium dim ethyl (DMS) was activated with 6 mg of dimethylanilinium perfluorotetraphenyl borate (DMAH) in 20 mL of toluene. In a separate flask, 2.0 mL of 1,7 octadiene was combined with 9.0 mL of decene-1. The combined monomers were added rapidly with stirring to the catalyst solution. Polymerization was allowed to proceed at ambient temperature (no external heating or cooling) for 3 hours at which time reaction was terminated by exposing the solution to air. This termination time was chosen because it was first determined that this specific polymerization gels to a "hockey puck" (solid mass) at around 3.5 hours. While still in solution, the product was stabilized with ~300–500 wppm antioxidant (di t-butyl par-methyl phenol-BHT) Then it is dried first under a stream of nitrogen followed by vacuum at 60° C. for about 36 hours. Product yield: 83%. Residual monomer concentrations in the product were measured by multiple extraction head space gas chromatography (MEHSGC) and found to be less than 2,000 wppm.

The product was examined by HNMR, GPC-VIS-DRI and oscillatory shear rheology. HNMR data shows that the product contains an abundant quantity of unsaturations, as expected. Data obtained from GPC are summarized in the Table below:

| GPC    | Mn   | Mw      | Mw/Mn | Mz        |
|--------|------|---------|-------|-----------|
| DRI(1) | 4890 | 208,200 | 42.6  | 1,375,000 |
| VIS    | 5240 | 834,700 | 160   | 7,385,000 |

(1) The Mark-Houwinck coefficients used for this sample are those for poly(propylene). Extensive measurements for linear ethylene/hexene copolymers and for poly(hexene-1) samples suggest that the Mark-Houwinck coefficients for these polymers are about 1.4 times higher than that of polypropylene).

Clearly, the DRI and VIS results diverge greatly at higher mass moments. A mass balance was performed on the sample, comparing the quantity of polymer injected on the column with the quantity detected. The quantity detected is calculated to be 104% of the mass injected. From this comparison, it is concluded that the sample does not contain gels at a detectable level (nor are gels visually apparent).

Figure 2:
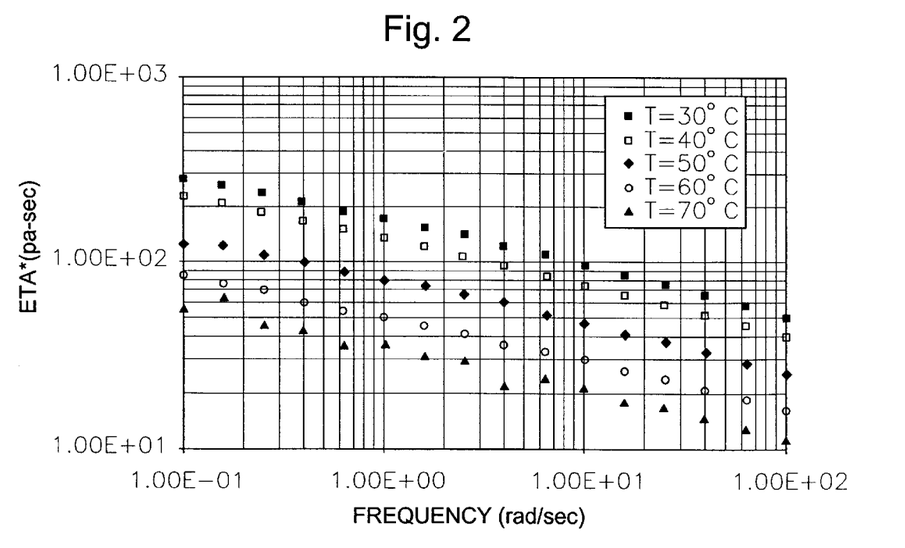
FIG. 2 is a plot of complex viscosity (eta*, e.g., $\eta^*$) versus oscillating shear frequency at various temperatures for a copolymer made in accordance with Example 1.

Given that, polymerization in the absence of 1,7 octadiene routinely gives polymers with $M_w/M_n \sim 2$ and $M_z/M_w \sim 1.6$, where Mn is in the range 1,000 to 2,000 (where $M_w$ is weight ave. molecular weight, $M_n$ is number ave. molecular weight and $M_z$ is as defined above.) and allowance of the reaction to proceed beyond ~3.5 hours leads to gel, the impact of 1,7 octadiene on the molecular weight parameters is clearly dramatic and consistent with extensive interlinking. Extensively interlinked chains can be substantially disentangled compared to linear counterparts and so exhibit unusual rheology. Oscillatory shear frequency scans (0.01 to 100 rad/sec) were performed on this polymer using an RMS800. Data at 30, 40, 50, 60, and 70° C. were recorded. In FIG. 2, the complex dynamic viscosity is plotted as a function of angular frequency for each temperature. These plots show that the viscosity of this polymer is exceptionally low and has a moderate shear sensitivity. For comparison, the dynamic viscosity of a linear or substantially linear poly (octene-1) with $M_w$ in the range of 500k recorded at 30° C. and low angular frequency is $\sim 1 \times 10^6$, Pa-sec, or about 3.5 orders of magnitude greater than the viscosity of Example #1 hyperbranched decene-1 copolymer.

Amorphous products isolated from these reactions are exceptionally sticky, but have modest cohesive strength. A Cole-Cole plot (FIG. 2) constructed from the data collected for Example #1 is consistent with this behavior. The plot shows that the ratio of loss molecules/storage molecules (G''/G') is substantially greater than 1 (between 2 and 3; indicative of strongly viscons behavior) over the entire frequency range scanned.

EXAMPLE #2

10 mg of DMS catalyst as in Example 1 is activated with 6 mg of dimethylanilinium perfluorotetraphenylborate (DMAH) in 20 mL of toluene. In a separate flask, 0.5 mL of 1,9 decadiene is combined with 10.0 mL of octene-1. The combined monomers are added rapidly with stirring to the catalyst solution. Polymerization is allowed to proceed at ambient temperature (again, no external heating or cooling) for 0.5 hours. Reaction is terminated by exposing the solution to air. The product was stabilized with ~300–500 wppm BHT, then dried under a stream of nitrogen followed by vacuum at 60° C. for about 2 days. Product yield: 92%.

This product was characterized by GPC-DRI-VIS. The GPC results are summarized below:

| GPC | $M_n$ | $M_w$ | $M_w/M_n$ | $M_z$ | $M_z/M_w$ |
|---|---|---|---|---|---|
| DRI | 3827 | 69,386 | 18.1 | 421,489 | 6.1 |
| VIS | 920 | 342,700 | 372.5 | 4,510,000 | 13.2 |

As was the case with Example #1, a substantial divergence is noted between the molecular weight measured by DRI and VIS at higher mass moments. This divergence is a hallmark of extensive interlinking.

Figure 3:
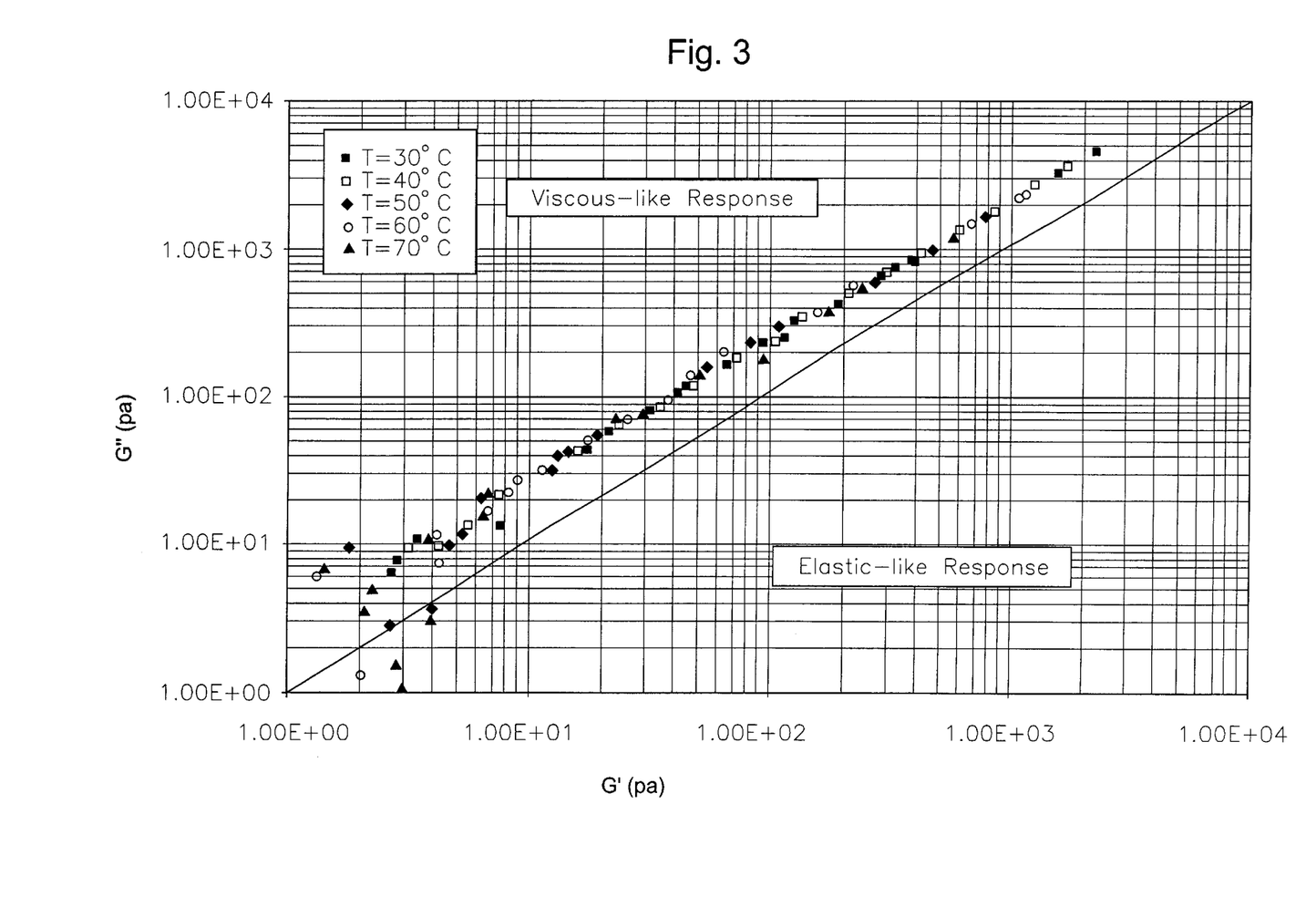
FIG. 3 is a Cole-Cole plot (log G' vs. log G") recorded for the copolymer of FIG. 2 made in accordance with Example 1.
Figure 4:
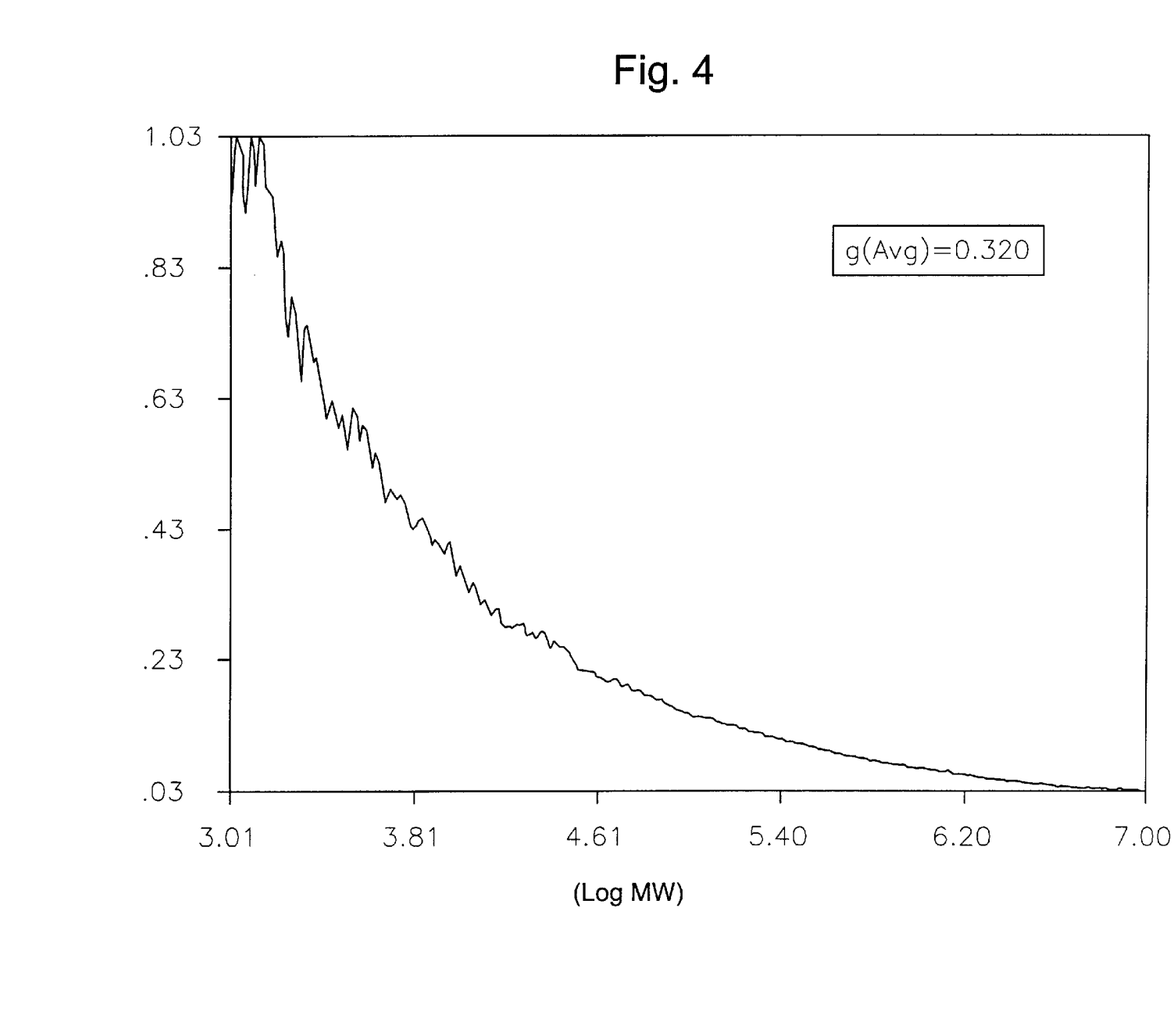
FIG. 4 is, like FIG. 1, a graph of g' vs. log Mw (weight-average molecular weight), this time for polymer example 40.
Figure 5:
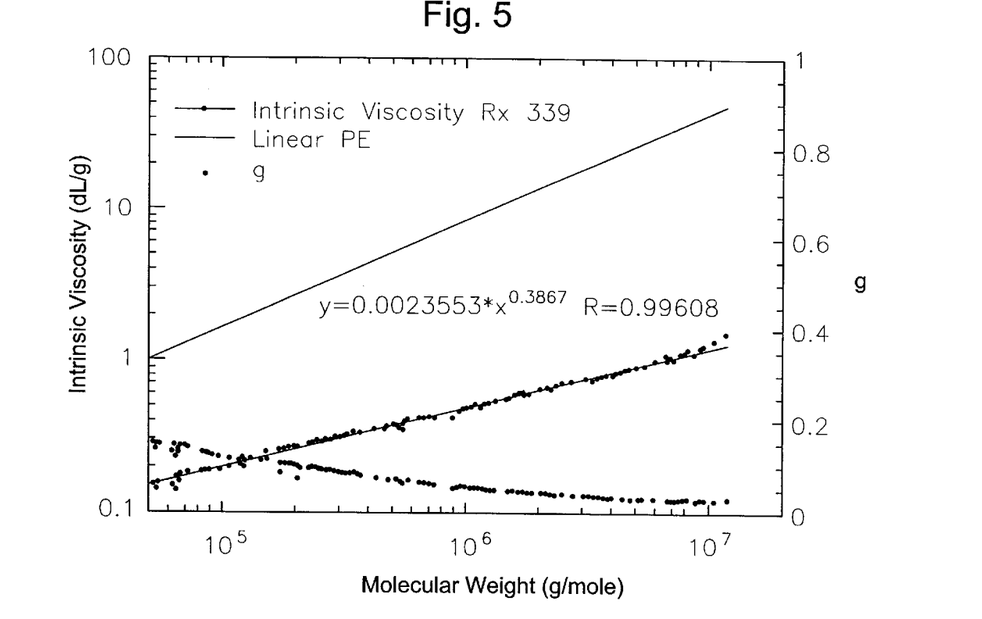
FIGS. 5–8 are plots of log Intrinsic Viscosity vs. Log molecular weight (weight-average) for copolymers made in accordance with Example 46 (polymer examples 40–43).
Figure 6:
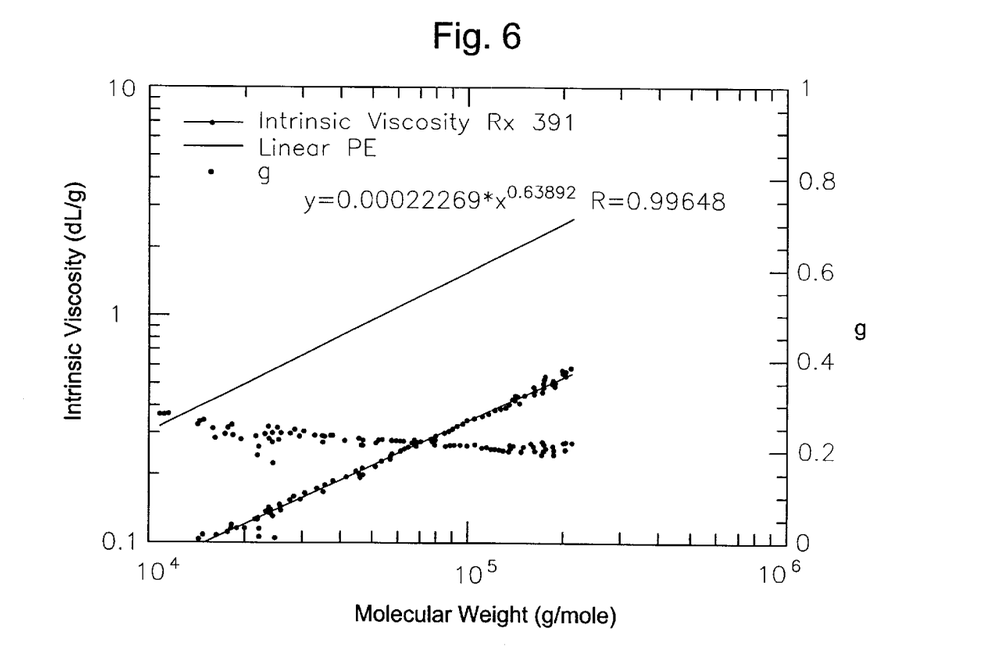
Figure 7:
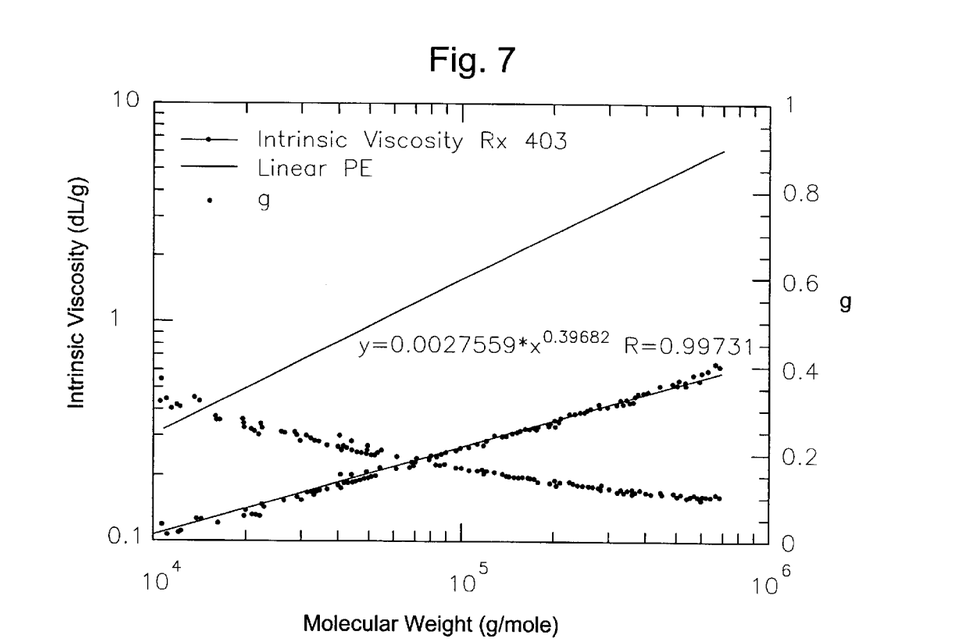
Figure 8:
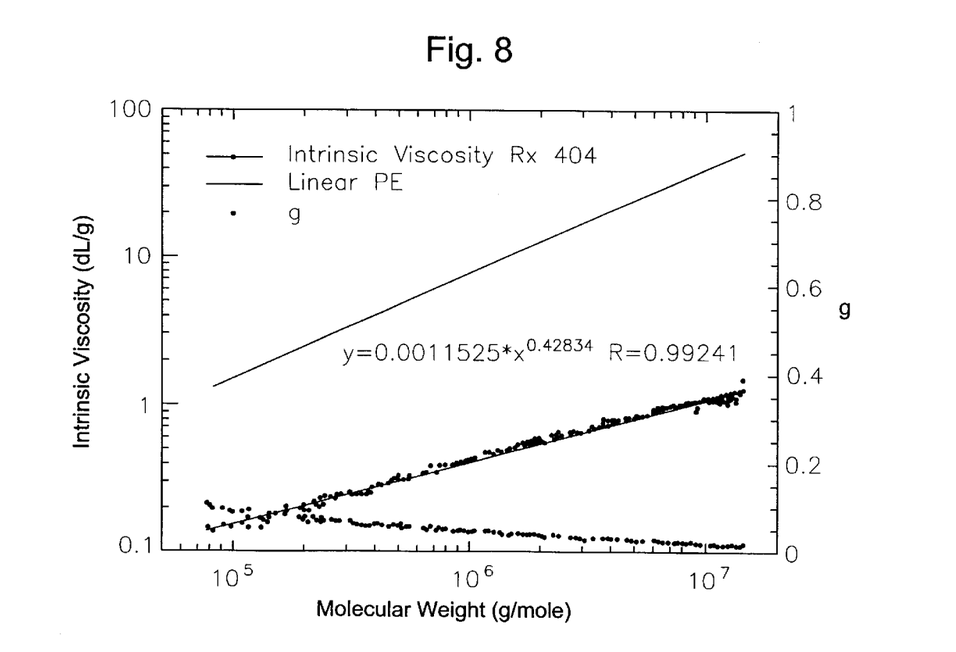

The plot for Example #2 is shown in FIG. 3. If the branched polymer candidate were in fact not branched relative to the linear standard, then of course g' would equal 1. In general, (long chain) branched polyolefin products made commercially—such as LDPE's—- might exhibit a g' which is depressed to ~0.6–0.7 at higher molecular weights. In this hyperbranched sample, g' is depressed well below 0.1 at higher molecular weight, and $g'_{ave}$ is just 0.33. This plot shows that the viscosity of the solution is dramatically depressed relative to the size of the molecules.

EXAMPLES 3–45

A control poly (1-octene) polymer and a series of copolymers were prepared in accordance with the general process of Example 1 using the same catalyst combination (DMS+DMAH) in 20 ml of toluene and at ambient temperature. These products are designated in Table 2 and the numbers in brackets are milliliters of each monomer introduced into the reactor. Hold times indicate reaction time prior to quenching. The following abbreviations are used:

TABLE 2

| 1,9 DD - | 1,9 decadiene |
|---|---|
| 1,7 OD - | 1,7 octadiene |
| C 6 - | 1 - hexene |
| C 8 - | 1 - octene |
| C 10 - | 1 - decene |
| 4 MP - | 4-methyl pentene-1 |
| 4 H - | 4-hexene |

| Ex. # | Diene | Olefin | Hold time (min) | Yield (g) |
|---|---|---|---|---|
| Control | 0 | C8[10] | 120 | 0.06 |
| 3. | 1,9DD[0.5] | C8[10] | 15 | 6.49 |
| 4. | " | " | 30 | 6.94 |
| 5. | 1,9DD[2.0] | C8[9] | 2.0 | Gel |
| 6. | " | " | 2.5 | Gel |
| 7. | " | " | 3.5 | Gel |
| 8. | 1,9DD[0.5] | C10[10] | 5.0 | 5.29 |
| 9. | " | " | 5.0 | 6.06 |
| 10. | " | " | 60 | 6.82 |
| 11. | " | " | 120 | 7.03 |
| 12. | " | " | 180 | 6.98 |
| 13. | " | " | 15 | 7.01 |
| 14. | " | " | 30 | 6.71 |
| 15. | " | C6[10] | 5 | 6.02 |
| 16. | " | " | 15 | 5.92 |
| 17. | " | " | 27 | Gel |
| 18. | " | " | 30 | 6.32 |
| 19. | " | " | 60 | 6.08 |
| 20. | " | " | 105 | Gel |
| 21. | 1,9DD[2] | C6[9] | 1 | Gel |
| 22. | " | " | 1.1 | Gel |
| 23. | " | 4MP[9] | 4 | 1.38 |
| 24. | " | " | 6 | Gel |
| 25. | " | " | 60 | 5.80 |
| 26. | " | " | 180 | 5.66 |
| 27. | " | 4H[9] | 2 | Gel |
| 28. | 1,7OD[2] | C8[9] | 5 | 1.73 |
| 29. | " | " | 15 | 6.41 |
| 30. | " | " | 30 | 6.84 |
| 31. | " | " | 30 | 0.74 |
| 32. | " | " | 60 | 6.92 |
| 33. | " | " | 120 | 0.07 |
| 34. | " | " | 120 | 7.10 |
| 35. | " | " | 180 | 6.97 |
| 36. | " | C10[9] | 30 | 2.29 |
| 37. | " | " | 60 | 6.52 |
| 38. | " | " | 120 | 7.13 |
| 39. | " | " | 180 | 6.70 |
| 40. | " | C6[9] | 5 | 2.58 |
| 41. | " | " | 15 | 6.26 |
| 42. | " | " | 30 | 6.07 |
| 43. | " | " | 60 | 6.85 |
| 44. | " | " | 120 | 6.56 |
| 45. | " | " | 180 | 6.59 |

The effect of reaction time on molecular weight for certain of the products made in accordance with Table 2 is shown in Table 3.

TABLE 3

| Ex. | Reac. Time(min) | Mn | Mw | Mz | MWD | Mz/Mw |
|---|---|---|---|---|---|---|
| 15 | 5 | 2454 | 16248 | 59,940 | 6.62 | 3.68 |
| 16 | 15 | 2686 | 29654 | 138,831 | 11.0 | 4.68 |
| 18 | 30 | 2422 | 29164 | 145,908 | 12.0 | 5.00 |
| 36 | 30 | 11,500 | 23,200 | 36,900 | 2.0 | 1.59 |
| 37 | 60 | 10,500 | 38,300 | 98,600 | 3.6 | 2.57 |
| 38 | 120 | 7240 | 75,100 | 392,000 | 10.4 | 5.23 |
| 39 | 180 | 5500 | 27,700 | 71,600 | 5.0 | 2.59 |

The population of olefins per 1,000 carbon atoms for each of the Table 3 products was determined by proton NMR and is shown in Table 4.

TABLE 4

| | Olefin Population Per 1000 carbon atoms (1000 C) from $^1$HNMR | | | | |
|---|---|---|---|---|---|
| Ex. | VINYL-IDENE | VINYL | 3° VINYLENE | 2° VINYLENE | Mn(NMR)$^a$ |
| 15 | 9.86 | 0.80 | 2.26 | 0.97 | 1021 |
| 16 | 8.51 | 0.60 | 1.97 | 0.88 | 1180 |
| 18 | 10 | 0.26 | 2.30 | 0.86 | 1053 |
| 36 | 0.6 | 5.9 | 0.57 | 0.99 | 1733 |
| 37 | — | — | — | — | — |
| 38 | 2.59 | 1.05 | 0.73 | 1.1 | 2536 |
| 39 | 1.37 | 3.99 | 0.67 | 0.98 | 1967 |

$^a$Mn(NMR) is based on the assumption of one unsaturation per chain.

EXAMPLE 46

Another parameter used to characterize the hyperbranched copolymers of this invention and differentiate them from prior art polymers is the plot of the relationship of the slope of log (intrinsic viscosity) vs. log (Mw) or log (radius of gyration) vs. log (Mw) of the copolymers. For most conventional linear or moderately branched polymers, these values are generally greater than 0.6, whereas the copolymers of this invention exhibit plot values of less than 0.6, more specifically less than 0.5.

Four different copolymers from designated reactions 40, 41, 42 and 43 were prepared by the general process of Example 1. The copolymers and their properties are set forth in Table 5.

TABLE 5

| Polymer | Diene | Olefin | Mn (GPC DR) | Mw (GPC DR) | Mz (GPC DR) |
|---|---|---|---|---|---|
| 40 | 1,9DD(0.5) | C8(10) | 3827 | 69,386 | 421,489 |
| 41 | 1,9DD(0.05) | C8(10) | 9410 | 31,800 | 51,800 |
| 42 | 1,9DD(0.5) | C5(10) | 1671 | 20,363 | 92,176 |
| 43 | 1,9DD(2) | C5(10) | 3452 | 126,811 | 797,971 |

GPC-MALLS and GPC-3D data for each of these polymers was obtained by the following methods.

GPC-MALLS (Polymer Radius of Gyration)

The instrument used is a Waters 150C GPC equipped with a Wyatt Technology Dawn DSP Multi-Angle Laser Light Scattering (MALLS) detector. The run conditions are 0.5 ml/minute flow of 1,2,4 trichlorobenzene (TCB) at 135° C. The polymer concentrations vary with polymer type. The columns used are three Polymer Laboratory Mixed B (10 μm) type columns. The injection volume is 300 μl.

The Wyatt Technology MALLS detector is the standard high temperature unit, but containing a 30 mW argon ion laser (488 nm) instead of the usual 5 mW helium neon laser (633 nm). The photodetectors are normalized with NBS1482, which is a National Bureau of Standards polyethylene standard with a stated molecular weight of 13,600 gm/mole. A radius of gyration, Rg, value of 5nm was assumed for this polymer.

The Rg values were obtained by fitting the angular dependence of the light scattering signal to a random coil model (both linear and branched molecules). This was done to account for the higher order moments in the form factors. The rigorous way to determine Rg is fit the data to a polynomial form and then extrapolate the slope at low angles.

GPC-3D (Polymer Intrinsic Viscosity)

The instruments used are a Waters 150C GPC, a Precision Detector light scattering (LS) detector, and a Viscotek high temperature differential viscometer. The run conditions were 0.5 ml/minute flow of 1,2,4 trichlorobenzene (TCB) at 135° C. The polymer concentrations varied with polymer type. The columns used were three Polymer Laboratory Mixed B (10 μm) type columns. The injection volume was 300 μl.

The Precision Detector LS detector is a two angle detector (15 and 90 degrees) which is used to measure the polymer MW. It was calibrated by running a series of polymers of known molecular weights (a combination of National Bureau of Standards polyethylenes and narrow polystyrene standards). Only the 15 degree angle was used in data analysis. The LS detector was placed behind the columns, but before the viscometer.

The differential viscometer was a four capillary type made by Viscotek. It was calibrated with a series of polymers of known intrinsic viscosities (same polymers as for the LS detector). The viscometer is positioned behind the LS detector, but before the differential refractometer (series configuration).

GPC MALLS and 3D plots were obtained for each polymer. The slopes of the plot of log (intrinsic viscosity) vs log (Mw) and log (radius of gyration) vs. log (Mw) were obtained and samples 40, 42 and 43 all showed slope values of less than 0.5. Sample 41 (a very lightly branched copolymer) exhibited a log slope value in excess of 0.6. GPC-3D (Intrinsic Viscosity) data for these copolymers as compared with other polymers is as follows:

| SAMPLE | SLOPE |
|---|---|
| Linear Polyethylene | 0.707 |
| Polypropylene | 0.683 |
| 40 | 0.3867 |
| 41 | 0.6389 |
| 42 | 0.3968 |
| 43 | 0.4283 |

Plots of log intrinsic viscosity vs. log molecular weight for samples 40, 41, 42 and 43 are shown in FIGS. 5–8.

I claim:

1. An olefin copolymer comprising one or more linear or branched α-monoolefin monomers having from 2 to 20 carbon atoms randomly copolymerized with at least one α,ω-non-conjugated diene having from 5 to 18 carbon atoms, said copolymer characterized by being hyperbranched, having highly branched polymer segments comprising said copolymerized α-monoolefin and diene copolymerized at least one olefinic end group of said diene, said copolymer, if made using the same catalyst system under the same polymerization conditions but without the presence of the α,ω-non-conjugated diene component, having a number average molecular weight as measured by GPC-Viscometry of less than about 5 times the entanglement molecular weight of said polymer and a degree of polymerization of less than 400 monomer repeating units, and said copolymer having a gel content of less than about 1.5 wt %, and a diene content of greater than 2 up to 20 mole %.

2. The copolymer of claim 1 wherein said number average molecular weight is less than 3 times said entanglement molecular weight.

3. The copolymer of claim 1 wherein the slope of a plot of the log (intrinsic viscosity) vs. the log (weight average molecular weight) of said copolymer is less than 0.6.

4. The copolymer of claim 3 wherein said slope is less than or equal to 0.5.

5. The copolymer of claim 1 having a molecular weight distribution of greater than 5.

6. The copolymer of claim 5 having a molecular weight distribution of greater than 8.

7. The copolymer of claim 1 having an Mz/Mw molecular weight ratio of greater than 3.

8. The copolymer of claim 7 wherein said ratio is greater than 5.

9. The copolymer of claim 1 containing greater than 2 mole % of said diene.

10. The copolymer of claim 1 which contains at least about 0.2 mole % of combined vinylene, vinylidene and vinyl residual unsaturation.

11. The copolymer of claim 1 containing at least 3 mole % of said α,ω-diene and further containing at least 1 vinyl group per 1000 carbon atoms of incorporated α,ω-diene which is not interlinked.

12. The copolymer of claim 1 which has a branching index g' (GPC-VIS) of from about 0.05 to about less than 0.5.

13. The copolymer of claim 1 which is functionalized with a reactant containing one or more polar functional groups capable of addition reactions with olefinic unsaturation present in said copolymer.

14. The copolymer of claim 1 wherein said α-monoolefin monomer contains 4 to 12 carbon atoms.

15. The copolymer of claim 14 wherein said diene contains 5 to 12 carbon atoms.

16. The copolymer of claim 1 wherein said copolymer would have a degree of polymerization of less than 200 monomer repeating units if made using the same catalyst system under the same polymerization conditions but without the presence of said α,ω-diene component.

17. The copolymer of claim 16 wherein said degree of polymerization is less than 100 monomer repeating units.

18. The copolymer of claim 1 which has a degree of crystallinity of less than 40%.

19. The copolymer of claim 1 containing greater than 2 up to about 10 mole % of said diene.

20. The copolymer of claim 19 containing about 3–8.5 mole % of said diene.

21. The copolymer of claim 1 containing less than 1 wt % gel.

22. A process for preparing a hyperbranched olefin copolymer comprising a) providing a coordination catalyst;

b) providing one or more linear or branched α-monoolefin monomers having from 2 to 20 carbon atoms;

c) providing 2 to 20 mole % α, ω-non conjugated diene monomers having from 5 to 18 carbon atoms;

d) contacting the catalyst of step(a) with the monomers of step(b) and step(c);

e) collecting a polymer characterized by
(i) a number average molecular weight as measured by GPC Viscometry of less than about 5 times the entanglement molecular weight of the polymer if made using the same catalyst system but without the presence of the α, ω-diene monomer;
(ii) a gel content of less than 1.5 wt %; and
(iii) a degree of polymerization of less than 400 monomer repeating units.

23. The process of claim 22 wherein the coordination catalyst is a single site catalyst.

24. The process of claim 22 wherein the number average molecular weight of the copolymer is less than 3 times the entangement molecular weight.

25. The process of claim 22 wherein the slope of the plot of log (intrinsic viscosity) vs. log (weight average molecular weight) of the copolymer is less than or equal to 0.5.

* * * * *